United States Patent [19]

Green

[11] Patent Number: 4,468,270

[45] Date of Patent: Aug. 28, 1984

[54] METHOD AND APPARATUS FOR FABRICATING FISHING RODS

[75] Inventor: Milton J. Green, Quilcene, Wash.

[73] Assignee: Woodstream Corporation, Lititz, Pa.

[21] Appl. No.: 286,682

[22] Filed: Jul. 24, 1981

[51] Int. Cl.³ .............................................. F16B 7/02
[52] U.S. Cl. ................................... 156/189; 156/190; 43/18.5
[58] Field of Search ................................ 156/190–192, 156/185, 189; 43/18.1, 18.5; 285/423

[56] References Cited

U.S. PATENT DOCUMENTS

| | | | |
|---|---|---|---|
| 3,452,468 | 7/1969 | Green | 43/18.5 |
| 3,623,930 | 11/1971 | Grosh | 156/191 X |
| 3,765,979 | 10/1973 | Thomas | 285/423 X |
| 4,070,127 | 1/1978 | Loomis et al. | 43/18.5 X |
| 4,362,418 | 12/1982 | Loomis | 43/18.5 X |

*Primary Examiner*—David A. Simmons

*Attorney, Agent, or Firm*—Holman & Stern

[57] ABSTRACT

A method of fabricating a tip section of a fishing rod with, an integral ferrule located at the butt end of the tip section, employs a mandrel having an annular shoulder separating two discrete mandrel sections. Heat-curable sheet material is wrapped about the first section adjacent the shoulder until the outer diameter of the wrapped material corresponds to the diameter of the second section of the mandrel. The result is a smooth transition from the second section to the wrapped material. Additional heat-curable material is then wrapped about the second section and the previously wrapped material overlapping the shoulder section. The wrapped material is compacted against the mandrel and heated until cured. Upon removal of the compacting forces of the mandrel, the cured material is in the form of a hollow rod having a ferrule for receiving another rod within the region of the second wrapped material.

6 Claims, 13 Drawing Figures

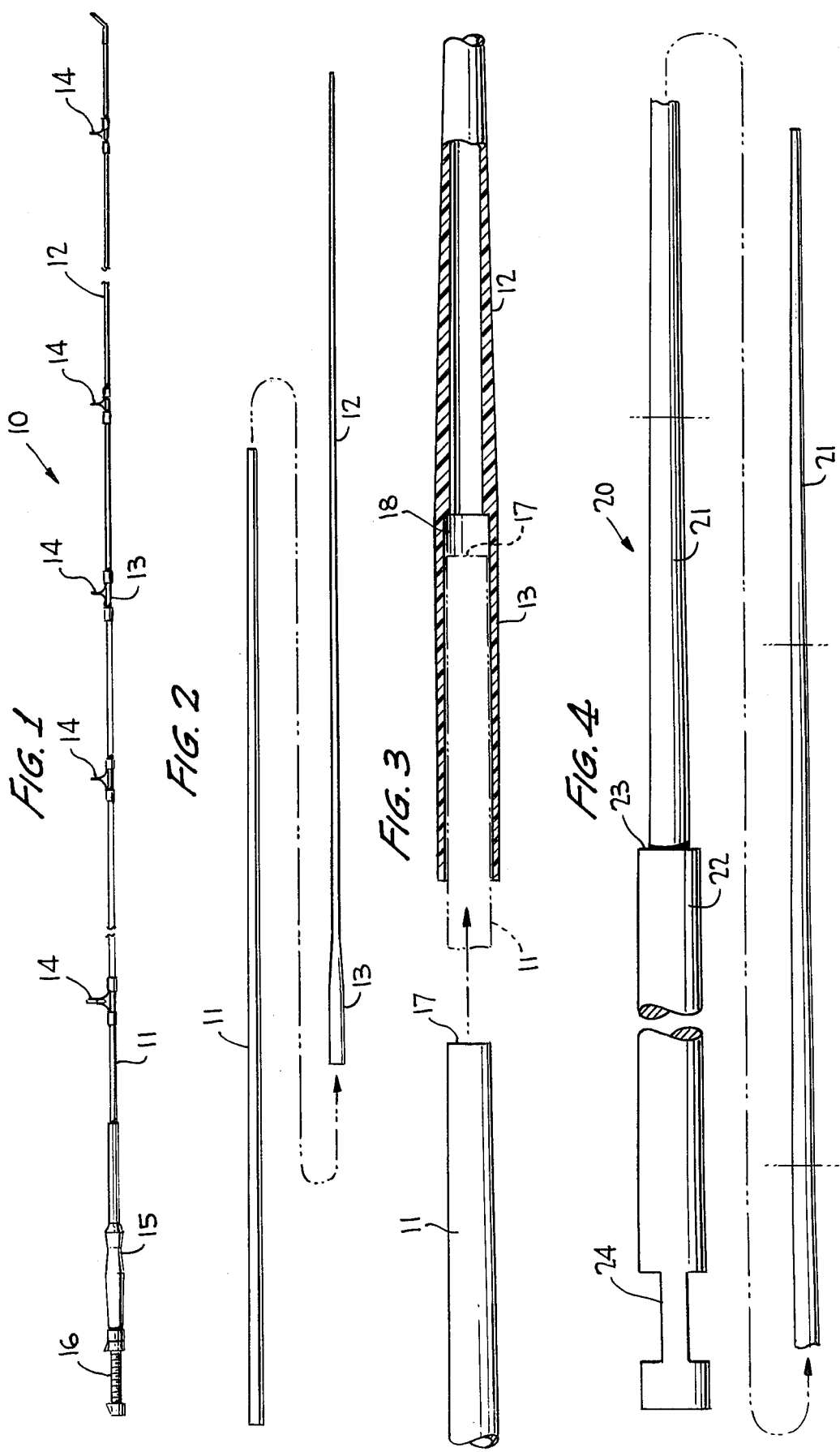

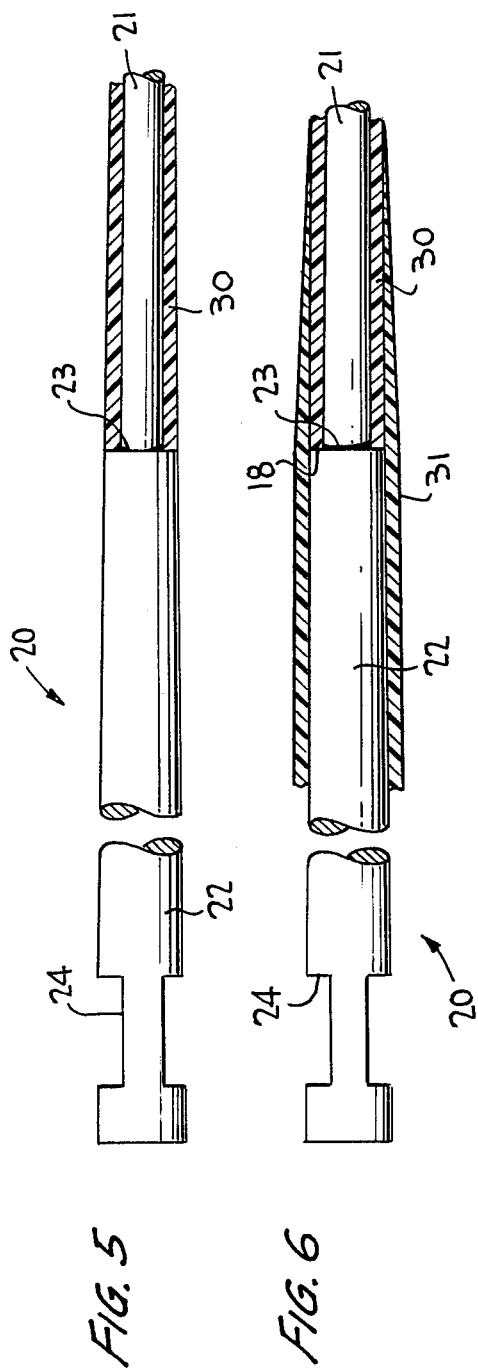
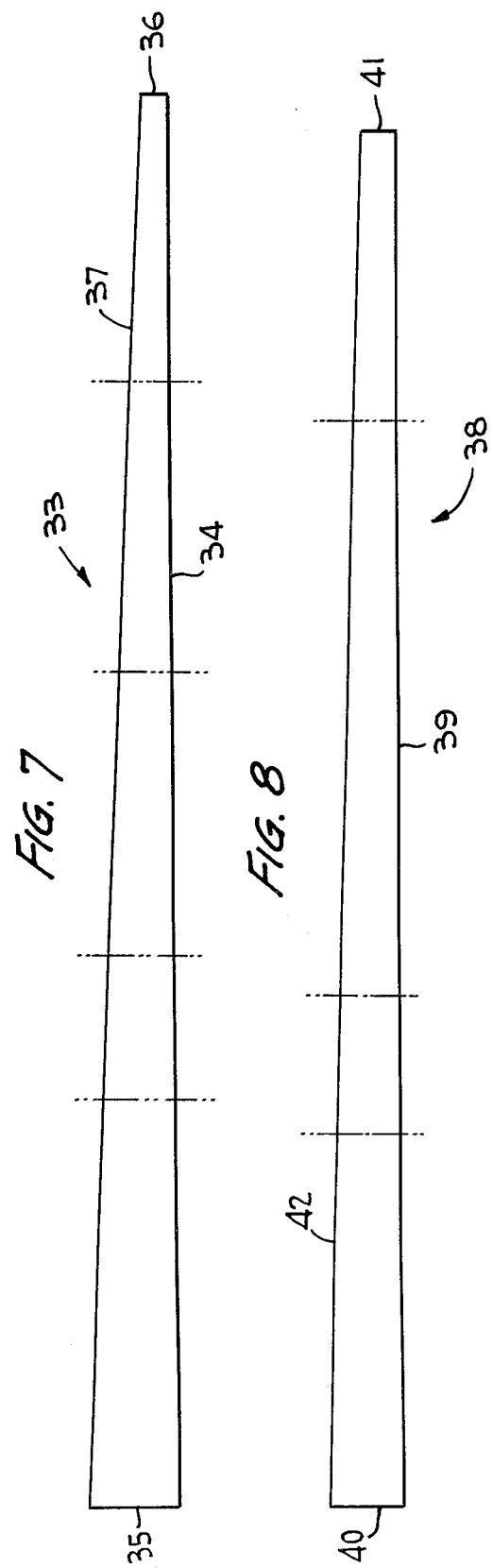

METHOD AND APPARATUS FOR FABRICATING FISHING RODS

TECHNICAL FIELD

The present invention relates to an improved method and apparatus for fabricating a sectional fishing rod suitable for casting, particularly fly casting. More particularly, the present invention relates to a method and apparatus for forming an improved ferrule structure at the butt end of the tip section of such a fishing rod.

BACKGROUND OF THE INVENTION

Fishing rods suitable for fly casting are generally so long as to require that the rod be fabricated in sections, usually a butt section and a tip section, so that it may be stored and transported conveniently. The sections are commonly joined together at a ferrule which is secured to the end of one section and telescopically receives the adjoining end of the second section. The ferrule must not only securely engage both sections; it must also provide sufficient strength to preclude permanent deformation or rupture under bending load without detracting from the tip flexibility required for efficient casting. Prior art ferrules generally require one or more separate steps during fabrication of the rod if they are to meet the stated strength and flexibility requirements.

It is an object of the present invention to provide a method and apparatus for fabricating a ferrule arrangement for a sectional fishing rod whereby the ferrule is formed along with one of the rod sections.

It is conventional to form sections of a fishing rod blank by wrapping resin-impregnated heat-curable sheets of material about a mandrel, compacting the wrapped material about the mandrel, and then curing the wrapped material with heat until the material solidifies. The compacting forces and the mandrel are then removed, leaving a tubular rod of desired configuration and properties. The mandrels used in these fabrication processes are generally tapered rods which have varying rates of taper along their lengths. Each rod section requires its own mandrel.

It is another object of the present invention to provide a mandrel for use in fabricating a fishing rod section, which mandrel permits a ferrule to be formed as an integral part of the rod section at the time the rod section is fabricated.

SUMMARY OF THE INVENTION

In accordance with the present invention, a mandrel for forming a tip section of a fishing rod has two tapered sections joined end-to-end at an annular shoulder. The smaller diameter section of the mandrel has one or more sheets of heat-curable material wrapped about it until the outside diameter of the material corresponds to the diameter of the second section of the mandrel adjacent the shoulder. In this manner, the wrapped material forms a smooth transition from the second or larger diameter section of the mandrel beyond the shoulder. Additional material can then be smoothly wrapped about the second section and the material which is wrapped about the first section. Material wrapped about the second section corresponds to the ferrule portion of the rod and, upon curing of the rod section, becomes integral with that section. The smooth transition of the wrapped material over the second section and the wrapped first section provides for a strong yet flexible ferrule section while permitting the ferrule to be fabricated inexpensively as part of the fabrication of the tip section of the rod.

BRIEF DESCRIPTION OF THE DRAWINGS

The above and still further objects, features and advantages of this invention will become apparent upon consideration of the following detailed description of a specific embodiment thereof, especially when taken in conjunction with the accompanying drawings, wherein:

FIG. 1 is a side view of an assembled fishing rod, the view being partially broken to accommodate the length of the rod;

FIG. 2 is an enlarged side elevation view of the tip and butt sections of the fishing rod of FIG. 1;

FIG. 3 is an enlarged side view showing the tip end of the butt section of the fishing rod in plan and showing the butt end of the tip section of the rod in partial cross-section;

FIG. 4 is a side view of a mandrel employed to fabricate the tip section of FIG. 3;

FIG. 5 is a side view showing a portion of the mandrel of FIG. 4 partially wrapped during fabrication of the tip section of the fishing rod;

FIG. 6 is a view of the mandrel, similar to FIG. 5, in a further stage of fabrication of the tip section of the fishing rod; and FIGS. 7–13, inclusive, are plan views of respective sheets of wrap material which are successively wrapped about the mandrel of FIG. 4 to form the tip section of the fishing rod illustrated in FIG. 2.

DESCRIPTION OF THE PREFERRED EMBODIMENT

Figure 9:
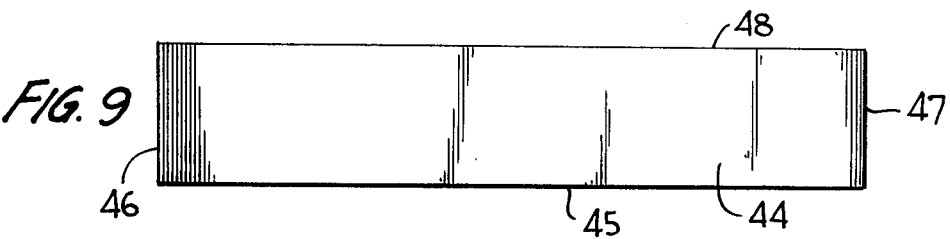

Referring specifically to FIG. 1 of the accompanying drawings, the fishing rod 10 includes a butt section 11 and a tip section 12. Apart from the formation of the ferrule 13 described below, these rods are essentially conventional and may be formed of fiberglass, graphite, or boron. The ferrule 13 formed as part of the present invention is most advantageously employed in a boron rod. The fabricated butt section 11 and tip section 12 are provided with conventional line guides 14, grip 15, and reel seat 16. The butt section 11 and tip section 12 are shown in FIG. 2 in greater detail with the ferrule 13 illustrated as comprising an integral part of the butt end of the tip section 12.

In forming the butt section blank 11, conventional techniques are employed whereby one or more sheets of resin-impregnated material (such as fiberglass, boron, graphite, etc.) are wrapped concentrically about a mandrel and then compacted against the mandrel by a spiral wrapping of cellophane strip material or the like. The compacted wrap material and mandrel are then heated until cured so that the material solidifies in the form of a hollow rod. The compacting cellophane and mandrel are removed leaving the rod as a separate structure. Both the tip and butt sections of the present rod are manufactured in substantially the same way, the difference residing in the inventive concept herein for forming the ferrule 13 in the manner described below.

As seen in FIG. 3, the ferrule 13 extends from the butt end of tip section 12 a comparatively short way along the length of the tip section 12. The hollow interior of ferrule 13 is tapered to conform to the outside periphery of the tip end of butt section 11 so that the butt section can be received in the ferrule in a friction fit engagement. The leading edge 17 of the butt end of tip section 11 is inserted into the ferrule when the tip and butt sections are to be joined. The interior of the ferrule 13 terminates in an annular shoulder 18 at which point the internal diameter steps down to a much smaller value before continuing its gradual taper toward the opposite end of tip section 12. When the tip and butt sections are engaged, as shown in phantom in FIG. 3, the leading edge 17 of the tip end of butt section 11 is spaced somewhat (i.e. on the order of ¼ inch or less) from the shoulder 18 marking the end of ferrule 13.

A mandrel for forming tip section 12 integral with the ferrule 13 is illustrated in FIG. 4 and is designated by the reference numeral 20. The mandrel 20 includes two primary longitudinally aligned sections 21 and 22 which adjoin one another at an annular shoulder 23. Viewing mandrel 20 from left to right in FIG. 4, section 22, which corresponds to thef errule portion of the tip member 12, tapers gradually until reaching the step or annular shoulder 23. At shoulder 23, the diameter of the mandrel steps down suddenly and thereafter tapers until the end of section 21 is reached. The taper may be at a constant rate versus mandrel length beyond shoulder 23; alternatively, different longitudinal parts of section 21 may taper at different rates with mandrel length, such parts being demarked by dotted lines extending cross-wise to the length of the mandrel in FIG. 4. A pulling slot 24 is defined at the end of mandrel section 22 remote from shoulder 23 by removing material from the periphery of the mandrel. Pulling slot 24 is employed to grab the mandrel when removing it from the cured rod after heating.

Referring to FIG. 5 of the accompanying drawings, in forming the tip section 12 of the fishing rod, one or more sheets of heat-curable material 30 is wrapped about section 21 of the mandrel 20 from shoulder 23 to the opposite end of mandrel section 21. This material 30 is wrapped until its outside diameter corresponds to the outside diameter of mandrel section 22 at shoulder 23. In this manner, the wrapped material 30 provides a continuation of the taper in mandrel section 22 which would otherwise be interrupted by shoulder 23. After material 30 has been wrapped to the stated outside diameter, additional heat-curable material 31 is wrapped about section 22 and a portion of wrapped material 30 so as to overlap the shoulder 23. When material 31 has been wrapped to the desired thickness, a cellophane strip (not shown) is spirally wrapped about the entire length of the mandrel to compact the fibers in material 30 and 31 and hold them in the desired shape. The compacted unit is then heated so that material 30 and 31 is cured and hardened. The cellophane and the mandrel are then removed leaving the solidified tip section 12. The particular number of sheets employed to form wrap materials 30 and 31 are totally matters of choice, depending upon the nature of the material, the desired thickness of the annular tip section 12, the desired flexibility of the tip section 12 and the strength to be imparted to the ferrule 13. For example, material 30 can be a single sheet wrapped to the necessary number of thicknesses to provide an outer diameter adjacent shoulder 23 which conforms to the outer diameter of mandrel section 22. Likewise, material 31 can be a single sheet configured as necessary and wrapped to the desired thickness to provide the characteristics required of the ferrule 13. On the other hand, each of materials 30 and 31 may comprise plural sheets which are sucessively wrapped about the mandrel to provide the resultant tip section after curing. FIGS. 7–13 illustrate successive sheets of wrapping material which I have successively employed to form a tip section in accordance with the present invention.

Referring specifically to FIG. 7, a first sheet 33 of wrap material has a generally trapezoidal configuration in plan. Sheet 33 has a base 34 extending perpendicular to two sides 35 and 36. A top edge 37 tapers such that side 35 is longer than side 36. The degree or rate of taper with length changes at various points along the length of the side 37 as indicated, by way of example, by the dashed lines in FIG. 7. In applying sheet 33 to mandrel 20, base 34 is tacked to the mandrel so as to extend from shoulder 23 to the distal end of section 21. The mandrel is then rotated so that sheet 33 is wound about section 21 with side 35 of the sheet abutting shoulder 23 of the mandrel. In an actual embodiment, the material of sheet 33 is boron fibers plus a woven scrim material and impregnated with a suitable resin.

Sheet 38 illustrated in FIG. 8 is also of generally trapezoidal configuration and has a base 39, sides 40 and 41, and a tapered top side 42. Sheet 38 is wrapped about sheet 33 so that the two sheets together correspond to the material 30 illustrated in FIGS. 5 and 6. In the exemplary embodiment described, the material for sheet 38 is a scrim material impregnated with a suitable heat-curable resin.

Figure 10:
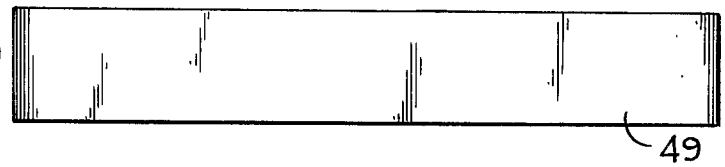
Figure 11:
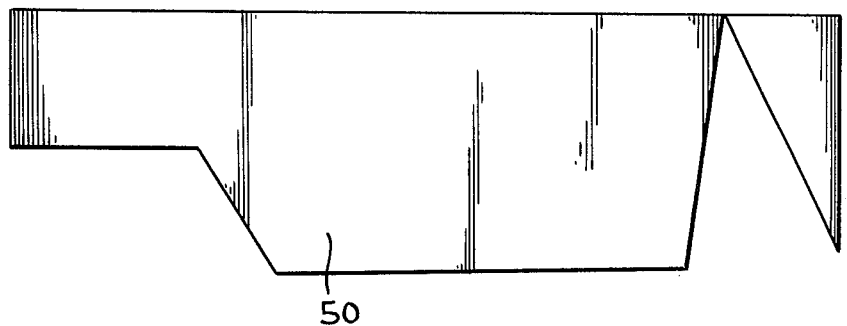
Figure 12:
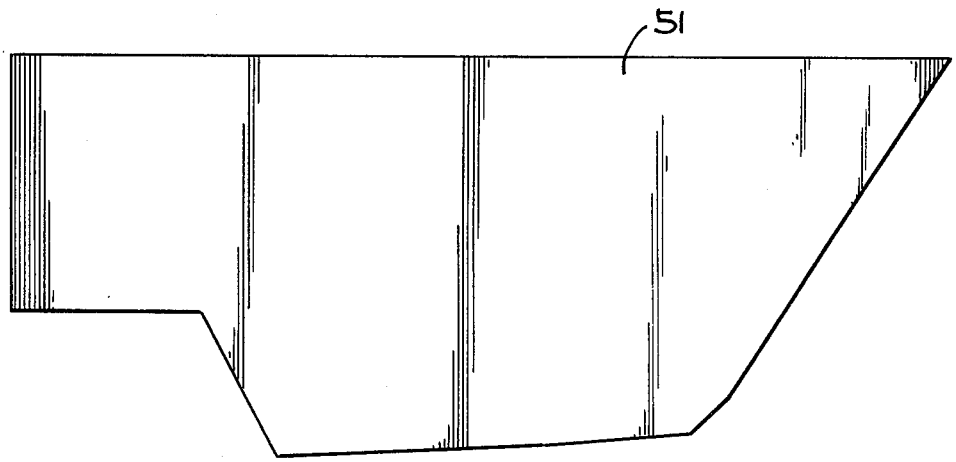
Figure 13:
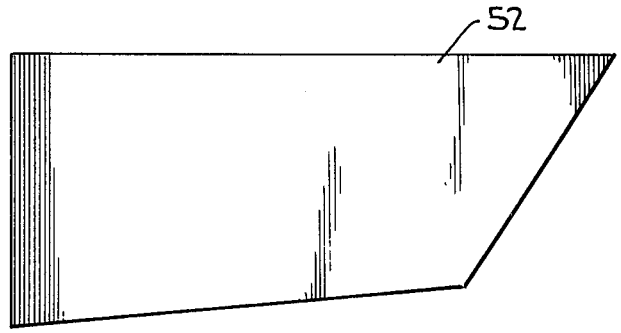

Sheet 44, illustrated in FIG. 9, is generally rectangular in configuration with long sides 45 and 48 and short sides 46 and 47. Sheet 44 is wrapped about mandrel section 22 and a portion of the length of wrapped material 30 by tacking down one of sides 45 or 48 and then rotating the mandrel. In the exemplary embodiment described, sheet 44 includes fibers of graphite plus a woven scrim material and impregnated by a suitable heat-curable resin. Another rectangular configured sheet 49, illustrated in FIG. 10, is then wrapped over sheet 44 after which a further sheet 50, illustrated in FIG. 11, is wrapped over sheet 49 and an additional portion of the material 30. Sheet 50 has an odd-shaped plan configuration rendering it wider in the portion which overlaps the shoulder 23 than in the portion which wraps about mandrel section 22 remote from shoulder 23. Sheet 49, in the exemplary embodiment is fabricated from the same material as sheet 33 whereas sheet 50 is fabricated from the same material as sheet 44. Two additional odd-shaped sheets 51 (as illustrated in FIG. 12) and 52 (as illustrated in FIG. 13) are wrapped about the previous sheets in the vicinity of mandrel section 22 and overlapping shoulder 23 to complete the wrapping. Both sheets 51 and 52 are fabricated from the same material as sheet 38. Sheets 44, 49, 50, 51, and 52 correspond to the second wrap material 31 in FIG. 6.

The particular configuration of the various sheets and number of sheets utilized to form the ferrule described hereinabove are matters of choice which, as noted above, depend upon the various characteristics and features of the rod and ferrule section.

The resulting tip section 12, with its integrally formed ferrule 13, receives the tip end 17 of butt section 11 in a friction fit engagement when the fishing rod 10 is assembled for use. The ferrule 13, being integral with the tip section 12 and having material 31 overlapping shoulder 18, is resistant to rupture during flexure of the tip section.

It is important that shoulder 23 extend generally or substantially perpendicular to or radially from the longitudinal axis of mandrel 20 so that the material 30 can be wrapped in a position with its edge snugly abutting the shoulder. This permits the outer diameter of the wrapped material 30 to effect a smooth and continuous transition from mandrel section 22 along the mandrel length. This in turn permits material 31 to be wrapped over section 22 and material 30 without gaps between the two materials. The absence of such gaps enhances the strength of the resulting ferrule 13. It is to be understood that "generally or substantially" perpendicular as used herein, means an angle of 90°±10°.

While I have described and illustrated one specific embodiment of my invention, it will be clear that variations of the details of construction which are specifically illustated and described may be resorted to without departing from the true scope and spirit of the invention as defined in the appended claims.

I claim:

1. A method of fabricating a hollow tapered rod having a ferrule formed at one end thereof to receive a further rod in friction-fit engagement, said method employing a rod-like mandrel having a cross-section configuration which tapers throughout the mandrel length and a shoulder extending generally perpendicular to the mandrel length which demarks a sudden change in the mandrel cross-section taper and defines first and second longitudinally-extending mandrel sections which adjoin one another at said shoulder, said first mandrel section having a smaller cross-sectional configuration than said second mandrel section, said method comprising the steps of:

(a) wrapping at least one sheet of heat-curable material about said first mandrel section such that the peripheral contour of the material at said shoulder matches the peripheral contour of said second mandrel section at said shoulder to provide a smooth transition between the peripheries of the second mandrel section and the wrapped material at said shoulder;

(b) wrapping at least one additional sheet of heat-curable material about said second mandrel section and at least a portion of said first mandrel section, overlapping said shoulder;

(c) applying a generally radial compacting force to the material wrapped about the mandrel in steps (a) and (b);

(d) heat curing the wrapped material to cause it to solidfy in its wrapped and compacted configurations; and (e) removing the compacting force and the mandrel from the solidified wrapped material; whereby said ferrule is defined by the material wrapped about said second mandrel section.

2. The method according to claim 1, wherein step (a) includes successively wrapping the first and second generally trapezoidal sheets about said first mandrel section, and wherein step (b) includes wrapping a plurality of sheets of different configurations about portions of said first and second mandrel sections.

3. The method according to claims 1 or 2, wherein step (c) comprises spirally wrapping a cellophane strip tightly about the wrapped mateerial.

4. The method according to claim 1, wherein said mandrel has a generally circular cross-section with a diameter which varies throughout the mandrel length, wherein step (a) includes wrapping said material such that the annular thickness of said material is substantially uniform throughout the entire first mandrel section.

5. The method according to claims 1 or 2, wherein said hollow tapered rod is a tip section of a sectional fishing rod and wherein said ferrule is adapted to receive a butt section of the sectional fishing rod, said method further comprising the step of securing line guides and a grip to the fishing rod.

6. In a method of forming a section of a sectional fishing rod by the technique of wrapping and compacting heat-curable material about a mandrel and then curing the wrapped material, an improvement comprising the steps of:

wrapping the heat-curable material about a first mandrel section of relatively small diameter such that the outer diameter of the wrapped material corresponds to the diameter of a second larger-diameter section of the mandrel adjacent an annular shoulder marking the transition between the first and second mandrel sections; and wrapping additional heat-curable material about portions of said first and second mandrel sections to overlap said shoulder.

* * * * *